United States Patent Office 3,542,602
Patented Nov. 24, 1970

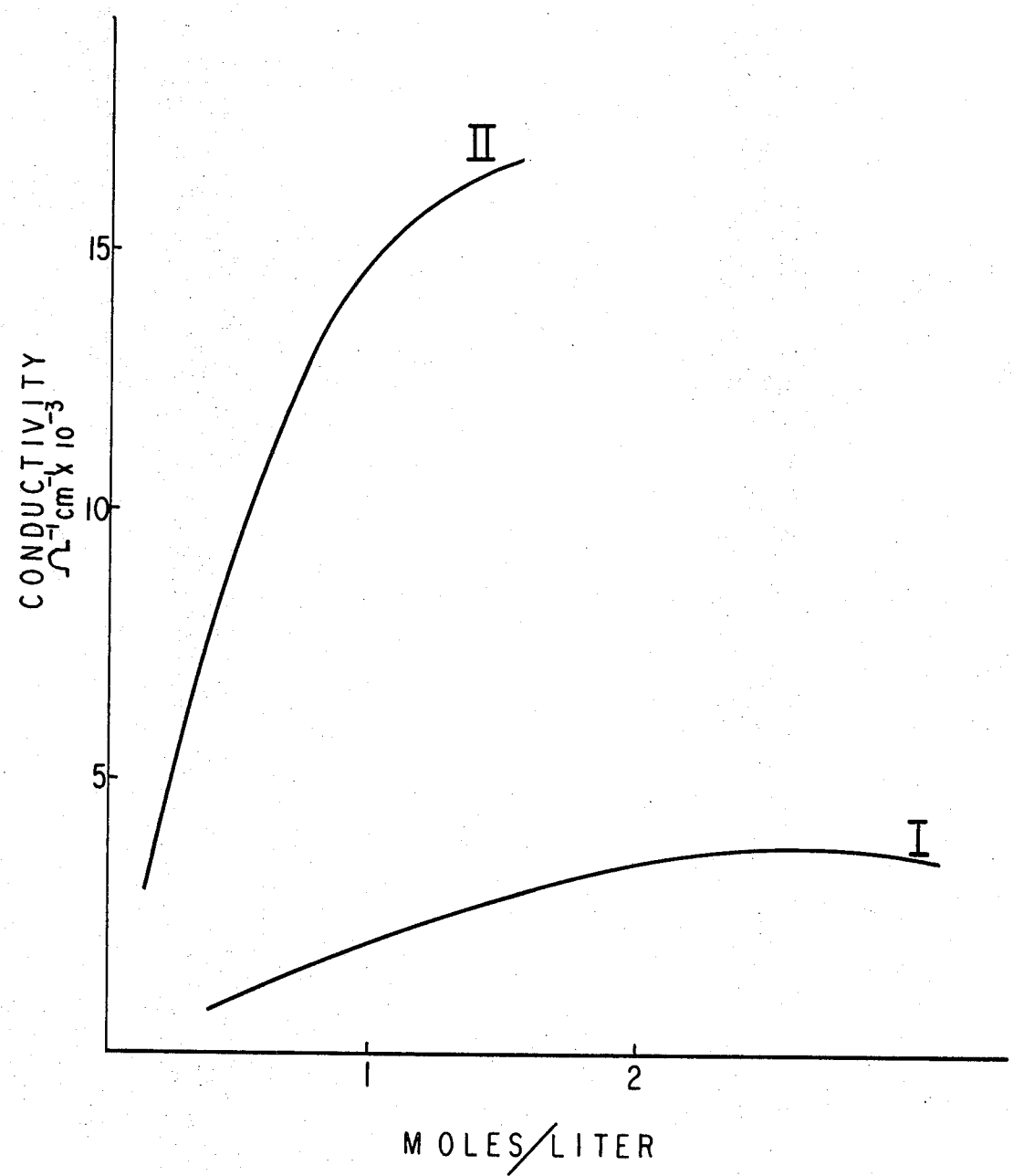

3,542,602
METHOD OF PREPARING NONAQUEOUS ELECTROLYTES PARTICULARLY FOR PRIMARY GENERATORS, THE ELECTROLYTES RESULTING FROM SAID METHOD AND PRIMARY GENERATORS CONTAINING THE SAID ELECTROLYTES
Jean-Paul Gabano, Poitiers, France, assignor to Societe des Accumulateurs Fixes et de Traction (Société Anonyme), Pont de la Folie, Romainville, France, a company of France
Filed Dec. 26, 1967, Ser. No. 693,320
Claims priority, application France, Dec. 30, 1966, 89,645
Int. Cl. H01m 11/00
U.S. Cl. 136—155
11 Claims

ABSTRACT OF THE DISCLOSURE

A nonaqueous electrolyte constituted by an aprotic organic solvent of the Lewis base type in which there is dissolved an ionizable addition complex constituted by an inorganic compound and an inorganic salt having a common constituent, a method for preparing such an electrolyte and in addition an electrochemical generator using such electrolyte.

RELATED APPLICATIONS

A related application by the same inventor entitled Secondary Electrochemical Generator and filed concurrently herewith on Dec. 26, 1967 under Ser. No. 695,311 is copending.

SUMMARY OF INVENTION

The present invention relates essentially to a method for preparing a non-aqueous but ionized electrolyte, particularly for primary electrochemical generators.

It is known that technics derived from the properties of aqueous electrolytes have been generally applied to non-aqueous electrolytes in order to make them conductive. Now aqueous electrolytes are essentially polar whereas in certain non-aqueous electrolytes, particularly of the aprotic type the bonds between atoms and molecules are of a practically non-polar type. In such bonds there is no question of electron gain or loss but a sharing of electron doublets either between two atoms or eventually between two molecules or between one atom and one molecule, resulting in a stable arrangement characterized, as the case may be, either by an electron octet on the peripheral shell, or by 12 electrons, or by 18 electrons.

This fact explains the failures and the obviously poor results occurring when a salt had to be dissolved in a non-aqueous solvent of organic type. It was believed that a process similar to that of the dissociation in an aqueous electrolyte of polar type would automatically occur, but the case was different.

This accounts for failures or very unsatisfactory results obtained by dissolving a salt in a non-aqeous organic type solvent. It was though that a process similar to that of the dissociation in an aqueous polar type electrolyte should occur automatically, but it did not.

An object of the present invention is to resolve the problem, and to provide a method for preparing such an ionizable electrolyte. The novel method is notably remarkable in that it comprises using an organic solvent of the Lewis base type, i.e. able to give one or more electron doublets, and in a first step, to form an addition complex between this solvent and an inorganic compound of the Lewis acid type, i.e. able to accept one or more electron doublets shared in common with the said solvent, and in a second step to submit this complex to the action of an inorganic ionizable salt whose anion is identical to one of the constituents of the said inorganic compound, and able to form with the latter an addition complex more stable than the complex previously obtained with the organic solvent, and so finally to form between the inorganic compound and the salt an addition complex, soluble and ionizable in the organic solvent.

In other words, in the method, a non-aqueous solvent designated by X is used with an inorganic compound $S_1$ and an inorganic salt $S_2$. In the first step, a first addition complex $XS_1$ results and generally forms with the non-aqueous organic liquid X a liquid of low or negligible conductivity. Then a salt $S_2$ is added to this liquid containing the soluble addition complex $XS_1$. Both $S_1$ and $S_2$ have a common constituent and are able to form an addition complex $S_1S_2$ which is also soluble and is more stable than the first addition complex $XS_1$. The resultant complex $S_1S_2$ is formed from the complex $XS_1$. Then the complex $S_1S_2$ becomes ionizable by electron sharing and coupling, as it will be described hereafter.

According to another feature and aspect of the invention, the complex $S_1S_2$ ionizes, and each ion solvates by fixing a certain number of solvent molecules.

According to another feature and aspect of the invention the number of solvent molecules fixed on the anion is less than that of the molecules fixed on the cation.

According to a further feature and aspect of the invention, an excess of the inorganic compound, with respect to the salt $S_2$ is used so that the resultant electrolyte contains a certain amount of it.

The invention also contemplates an electrolyte as a new industrial product, notably remarkable in that it comprises an organic solvent of non-polar type and of Lewis base type, in which an addition complex is dissolved, the latter consisting of an inorganic compound and a salt having a common constituent, this complex being ionizable.

A feature of the process according to this invention lies in that the salt $S_2$ may be insoluble in the initial non-aqueous organic liquid X. Nevertheless, with the method according to the invention it is possible to dissolve large quantities of salt $S_2$ which forms with the inorganic compound $S_1$ an ionizable addition complex $S_1S_2$, so the whole medium becomes conductive, allowing current to flow from one electrode to the other. Such an electrolyte constituted by complexes confers high power-to-weight and power-to-volume ratios to electrochemical primary and secondary generators using strongly reactive negative electrode materials such as lithium or other alkali metals.

Other objects and features of the invention will become apparent from the following detailed description and the accompanying drawing forming part hereof wherein the single figure shows two curves plotted with values of conductivity as ordinates and quantities of ionizable complex expressed in moles per liter of tetrahydrofuran, the curves relating respectively to a first complex ($BF_4Li$) and a second complex ($AlCl_4Li$).

The invention will be very clearly understood with reference to the following examples:

EXAMPLE 1

An organic solvent X able to give electrons and thus considered as a Lewis base, can be used. It is the case, for example, of tetrahydrofuran whose electronic formula can be schematically written:

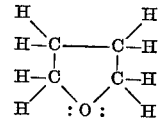

where two electron doublets are shown beside the oxygen atom. These doublets confer the Lewis base property to tetrahydrofuran.

When a Lewis acid compound (as an $S_1$ inorganic compound) is added to tetrahydrofuran it will accept electrons and more particularly electron doublets so that an addition complex will be formed by sharing of electron doublets in common.

For this purpose, an inorganic compound $S_1$, such as boron fluoride can be used for example. As a matter of fact this $S_1$ compound results from the connection of one boron atom containing 3 electrons in its peripheral shell and three fluorine atoms containing 7 peripheral electrons. Schematically boron fluoride can be shown as follows, with its boron and fluorine electron sharing:

$$\begin{array}{c} :\ddot{F}: \\ :\ddot{F}:B \\ :\ddot{F}: \end{array}$$

In this formula each fluorine atom contains an electron octet in the peripheral shell, whereas two electrons are missing on the peripheral shell of boron to complete an octet.

Therefore, it is seen that boron fluoride is of Lewis acid type since it is able to accept an electron doublet.

Consequently when ($S_1$) boron fluoride and (X) tetrahydrofuran are in contact, an addition complex is formed by sharing an electron doublet belonging to the tetrahydrofuran. This complex is as follows:

$$\begin{array}{c} CH_2\!-\!CH_2 \\ |\quad\quad| \\ CH_2\quad CH_2\quad :\ddot{F}: \\ \diagdown\diagup \\ :\ddot{O}: \Longrightarrow B\quad :\ddot{F}: \\ :\ddot{F}: \end{array}$$

It is seen that the boron atom thus makes up its peripheral electron shell to an electron octet.

In practice, when tetrahydrofuran and boronfluoride are in contact an addition complex $XS_1$ is formed but the reaction is so strongly exothermic that the mix must be cooled.

The resulting liquid is practically non-conductive. Therefore, it is necessary to apply the method according to the invention. In other words the complex $XS_1$, i.e. in this example tetrahydrofuran-boron fluoride complex, must be decomposed and another complex must be formed by using inorganic salt. The latter should be able to form with the compound $S_1$ an addition complex more stable than $XS_1$.

Since the compound $S_1$ is a fluoride, another fluoride should be used as salt $S_2$, for example, lithium fluoride. In fact, boron fluoride and lithium fluoride are able to form an addition complex $S_1S_2$ more stable than the $XS_1$ complex boron fluoride tetrahydrofuran. The electronic diagram of the $S_1S_2$ complex is as follows:

$$\begin{array}{c} :\ddot{F}: \\ :\ddot{F}:B:\ddot{F}:Li \\ :\ddot{F}: \end{array}$$

This complex is soluble in tetrahydrofuran, with formation of anion $BF_4^-$ and cation $Li^+$.

In other words, the result is the desired solubilization of lithium fluoride which does not dissolve normally in tetrahydrofuran. Such a fact is probably due to the high lattice energy ascribed to the very small diameters of constituting atoms.

An explanation of the solubilization process may be the following: In boron fluoride $BF_3$ all bonds are covalent because the fluoride is the result of electron doublet sharing, whereas in lithium fluoride the bonds are ionic because the single electron on the peripheral shell of the lithium passes on the peripheral shell of the fluorine to form a compound of the type $(F^-Li^+)$.

Now the complex obtained by adding to boron fluoride a lithium fluoride comprises a full electron octet around the boron atom by the arrangement of four surrounding fluorine atoms. Thus the group $$\begin{array}{c} F \\ FBF \\ F \end{array}$$

acquires a negative charge owing to the ionic bond with the lithium giving its single electron, so that between this group and the lithium an ionic bond takes place in which the group becomes the anion and the lithium the cation. This complex may be written:

$$[BF_4]^-Li^+$$

This $S_1S_2$ complex dissolves in tetrahydrofuran because of its low lattice energy due to the large size of the $BF_4$ group.

Thus it is seen that, according to the invention, it is possible to make soluble in tetrahydrofuran a salt, such as lithium fluoride, which is normally insoluble in it, by formation of an ionized complex having a low lattice energy.

After this first conversion, the boron fluoride-lithium fluoride ($S_1S_2$) complex being ionized in anion $BF_4^-$, and cation $Li^+$, each of these ions will solvate fixing a certain number of moles of solvent X to give:

$$(n'X)BF_4^- \text{ and } (nX)Li^+$$

where $n$, $n'$ are integers and $n > n'$ because the solvent being a Lewis base, the lithium cation will solvate more readily owing to its acid characteristic.

Thus, the process according to the invention will have the following steps:

dissolution
ionization
solvation
dissociation the two last steps being practically simultaneous.

Thus, owing to the invention, the solution is finally conductive.

It has been found that during the preparation of the conductive non-aqueous solution according to the invention, tetrahydrofuran tends to polymerize in presence of boron fluoride $BF_3$ under the effect of traces of water. To avoid this polymerization it is advantageous to add a small quantity of pyridine to the liquid. An amount of 1% has been found very efficient.

EXAMPLE 2

The process according to the invention can be applied to the case of lithium chloride by previously using aluminum chloride instead of boron fluoride. The electronic formula of aluminum chloride may be written similarly:

$$\begin{array}{c} :\ddot{Cl}: \\ :\ddot{Cl}:Al \\ :\ddot{Cl}: \end{array}$$

because aluminum atom contains three peripheral electrons and chlorine seven electrons. Each chlorine atom in aluminum chloride is surrounded with an electron octet whereas an electron doublet is missing in the aluminum atom. Thus aluminm chloride has a Lewis acid characteristic since it can accept an electron doublet. Therefore, tetrahydrofuran and aluminum chloride are able to form an addition complex $XS_1$ of the following formula:

$$\begin{array}{c} CH_2\!-\!CH_2 \\ |\quad\quad| \\ CH_2\quad CH_2\quad :\ddot{Cl}: \\ \diagdown\diagup \\ :\ddot{O}: \Longrightarrow Al:\ddot{Cl}: \\ :\ddot{Cl}: \end{array}$$

Since lithium chloride $S_2$ is able to form with aluminum chloride an addition complex $(S_1S_2)$ more stable than the addition complex $(XS_1)$ aluminum chloride-tetrahydrofuran, the latter will be displaced to give the following addition complex:

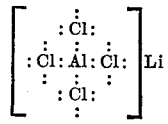

In this case the lithium is connected to the $AlCl_4$ group by an ionic bond through the cession of its electron, hence the formation of $AlCl_4^-$ anion and $Li^+$ cation which solvate each in its turn, the cation being the more solvated.

The method according to the invention is here again the following dissolution, ionization, solvation, dissociation, the two last steps being practically simultaneous.

The new solution should therefore be conductive, and experiment confirms the fact.

EXAMPLE 3

In the two aforedescribed examples, the addition complex [$BF_3$, FLi] dissolved in tetrahydrofuran is a $F^-$ ion conveyor, whereas the addition complex [$AlCl_3$, ClLi] is a $Cl^-$ ion conveyor.

It has been found that this type of electrolyte could be further improved by adding an excess of compound $S_1$, for example, boron fluoride, or aluminum chloride so that the non-aqueous liquid electrolyte finally comprises the solvent X, the addition complex $S_1S_2$ and the compound $S_1$.

This electrolyte can be used wherever an ionizable but non-aqueous electrolyte is needed, and particularly in electrochemical primary generators, for example, with lithium negative electrodes.

EXAMPLE 4

It has also been found that such an electrolyte derived from Examples 1, 2 or 3 could be used with positive electrodes made of copper sulfide or copper oxide without the formation of insoluble lithium sulfide. As a matter of fact, the electrolyte prepared according to the present invention has the advantageous characteristic of dissolving sulfur in a reduced state as well as lithium in an oxidized state, both being products of the discharge reaction. Therefore, the electrode polarization is avoided, occurring as a result of an accumulation of products at the vicinity of the electrode.

It must be said that during the discharge the reduction of copper sulfide gives sulfur ions $S^{--}$ of highly basic characteristic. The sulfur $S^{--}$ meets in the electrolyte a compound of a Lewis acid type such as $BF_3$ which attracts the electron doublet precisely brought in by the sulfur ion $S^{--}$. Thus, an addition complex $BF_3S$ is formed, giving in turn with the oxidized lithium, a new addition complex $(BF_3S)Li_2$ sufficiently soluble in the electrolyte.

So, owing to the means provided by the present invention, the system Li-CuS can be discharged without any formation of insoluble compound such as lithium sulfide and the positive electrode polarization is avoided. As a matter of fact, such an insoluble compound would polarize the positive electrode, so restraining the discharge.

The complete process of the discharge with an electrolyte according to the invention may be written as follows:

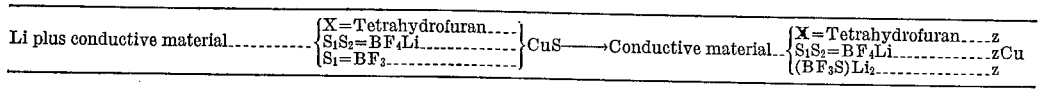

Experiment has also shown that cupric oxide CuO could be used as cathode. The phenomenon occurring then is similar to that with copper sulfide.

The oxygen of copper oxide is reduced during the discharge and gives a very strong base $O^{--}$. The latter forms with a Lewis type acid such as boron fluoride an addition complex which, in turn, forms with the oxidized lithium a new addition complex soluble in the electrolyte X.

Owing to the present invention, two most important results are obtained:

(a) a non-aqueous electrolyte which is ionized and therefore, is sufficiently conductive.

(b) electrochemical primary generators able to discharge without electrode polarization since the discharge products due to positive electrode reduction and negative electrode oxidation are and remain in a dissolved state.

EXAMPLE 5

The $S_1$ compounds can be different fluorinated compounds, as phosphorus pentafluoride $PF_5$ having 5 electrons in the peripheral shell. When one phosphorus atom and five fluorine atoms share electron doublets, each fluorine atom is surrounded by an electron octet but the phosphorus atom will have ten electrons (five originals and five from the sharing with fluoride atoms). In this case, the stable arrangement of the peripheral shell comprises 12 electrons, and, therefore, the phosphorus atom is able to accept one more electron doublet.

The corresponding arrangement may be shown as follows:

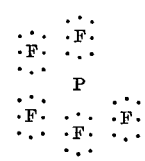

EXAMPLE 6

N-methyl—2 pyrrolidone may be used as the X solvent, its formula is:

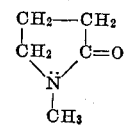

The available electron doublet is found on the nitrogen.

As compounds $S_1$, those named above, may be used, i.e. $BF_3$, $AlCl_3$ and $PF_5$ or different $S_1$ compounds from the previously named compounds may also be used.

Either FLi when $S_1$ comprises fluorine, or ClLi when $S_1$ comprises chlorine may be used as salt $S_2$.

EXAMPLE 7

Dimethoxyethane (or glycol dimethylethane) may be used as the X solvent, its formula is:

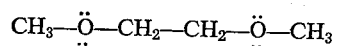

where the electron doublets which can be donated are found on the oxygen atoms. The previously named $S_1$ and $S_2$ compounds can be used.

EXAMPLE 8

Dimethoxymethane can be used as the X solvent. Its formula is:

the electron doublets which can be donated are on the oxygen atoms. The $S_1$ and $S_2$ compounds as noted in the previous examples can be used.

EXAMPLE 9

Tetrahydrofurfuryloxytetrahydrofuran may be used as the X solvent. Its formula is:

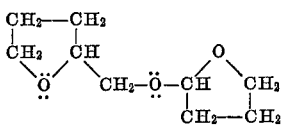

where the electron doublets which can be donated are found on the three oxygen atoms. The $S_1$ and $S_2$ compounds are the same as in the above examples.

EXAMPLE 10

Diglyme or diethylene glycol dimethylether may also be used as the X solvent. Its formula is:

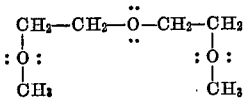

where the electron doublets which can be donated are found on the three oxygen atoms. The $S_1$ and $S_2$ compounds are the same as in the above examples.

In the accompanying drawing two curves are presented. The abscissae are the quantities of ionizable complex expressed in moles per liter of tetrahydrofuran, whereas ordinates are the values of the conductivity.

The curve I is related to the use of the $S_1S_2$ complex ($BF_4Li$) whereas the curve II is related to the use of $S_1S_2$ complex ($AlCl_4Li$).

Of course, the present invention relates to all electrochemical primary generators using the said electrolyte.

In such primary generators using electrolytes of the examples, the negative electrode has its active material identical with the cation of the ionizable inorganic salt $S_2$, for example, if the ionizable salt is lithium fluoride or lithium chloride, the active material of the negative electrode is lithium, while the positive electrode of the said generator may have as its active material copper sulfide or copper oxide.

While specific embodiments of the invention have been disclosed, variations within the scope of the appended claims are possible and are contemplated. There is no intention, therefore, of limitation to the exact abstract or disclosure herein presented.

What is claimed is:

1. A method of preparing a non-aqueous, conductive electrolyte comprising the steps of providing tetrahydrofuran as sole organic solvent, adding to said sole organic solvent an inorganic compound selected from the group consisting of boron fluoride and aluminum chloride to form a first addition complex of said sole solvent and said inorganic compound and then adding an inorganic salt having its anion in common with the anion of said inorganic compound and its cation different therefrom and being selected from the group consisting of metallic fluorides and metallic chlorides, thereby forming a resultant second addition complex of said inorganic compound and said inorganic salt, which second addition complex is soluble in the sole organic solvent and is ionizable, said second addition complex consisting of metallic fluoroborates or tetrachloroluminates, said inorganic compound being added to the said sole organic solvent in excess of that required to react fully with said inorganic salt to produce said second complex, thus forming a non-aqueous conductive electrolyte consisting solely of said organic solvent, said second addition complex and said first addition complex.

2. A method according to claim 1, including the step of adding a polymerization inhibitor to the organic solvent to prevent its polymerization in the presence of traces of water.

3. A method of preparing a non-aqueous conductive electrolyte according to claim 1, wherein adding said inorganic compound to said organic solvent provides an exothermic reaction, and cooling is effected prior to the said addition of said inorganic salt.

4. A non-aqueous conductive electrolyte consisting of tetrahydrofuran as sole organic solvent together with a first reaction produce of said sole organic solvent and an inorganic compound selected from the group consisting of boron fluoride and aluminum chloride, and together with a second reaction product of said first reaction product with an inorganic salt having its anion in common with said inorganic compound and selected from the group consisting of metallic fluorides and metallic chlorides, said second reaction product consisting of metallic fluoroborates and tetrachloroaluminates.

5. A non-aqueous electrolyte according to claim 4, wherein said inorganic salt is selected from the group consisting of lithium fluoride and lithium chloride.

6. A non-aqueous conductive electrolyte for an electrochemical cell consisting of tetrahydrofuran as sole organic solvent, together with a tetrahydrofuran-boron-fluoride complex and together with an ionizable lithium-boron-fluoride addition complex dissolved in said tetrahydrofuran.

7. A non-aqueous, conductive electrolyte for an electrochemical generator consisting of tetrahydrofuran as sole solvent, together with a tetrahydrofuran-aluminum-chloride complex and together with an ionizable lithium-aluminum-chloride addition complex dissolved in said tetrahydrofuran solvent.

8. A primary cell comprising a positive electrode selected from the group consisting of copper sulfide and copper oxide, an alkali metal negative electrode and a non-aqueous conductive electrolyte consisting of tetrahydrofuran as sole organic solvent together with a complex salt selected from the group consisting of metallic fluoroborates and tetrachloroaluminates together with an inorganic compound selected from the group consisting of boron fluoride and aluminum chloride respectively, existing as a reaction product complex with said sole organic solvent.

9. A primary cell according to claim 8 wherein said alkali metal of said negative electrode is lithium.

10. A primary cell according to claim 8 wherein the organic solvent is solely tetrahydrofuran, the complex salt is lithium-tetrafluoroborate, the inorganic compound is boron fluoride and the reaction product is a tetrahydrofuran-boron fluoride complex and wherein the alkali metal of the negative electrode is lithium.

11. A primary cell according to claim 8, wherein the organic solvent is solely tetrahydrofuran, the complex salt is lithium-tetrachloroaluminate, the inorganic compound is aluminum chloride and the reaction product is a tetrahydrofuran-aluminum chloride complex, and wherein the alkali metal of the negative electrode is lithium.

References Cited

UNITED STATES PATENTS

| | | | |
|---|---|---|---|
| 3,393,093 | 7/1968 | Shaw et al. | 136—155 XR |
| 3,404,042 | 10/1968 | Forster et al. | 136—6 XR |
| 3,415,687 | 12/1968 | Methlie | 136—155 XR |
| 3,423,242 | 1/1969 | Meyers et al. | 136—154 XR |
| 3,468,716 | 9/1969 | Eisenberg | 136—154 XR |

OTHER REFERENCES

Hill et al.: Research and Development of a High Capacity, Nonaqueous Battery, prepared for NASA on Aug. 15, 1965, Contract No. NAS 3–2780, pages 1–4 and 109–126.

DONALD L. WALTON, Primary Examiner

U.S. Cl. X.R.

136—100